United States Patent
Bardenhagen et al.

(10) Patent No.: US 11,664,532 B2
(45) Date of Patent: May 30, 2023

(54) SOLID-STATE BATTERY BASED ON AN ION-CONDUCTIVE MATRIX COMPOSED OF CAMPHOR OR 2-ADAMANTANONE

(71) Applicant: FRAUNHOFER-GESELLSCHAFT ZUR FOERDERUNG DER ANGEWANDTEN FORSCHUNG E.V., Munich (DE)

(72) Inventors: Ingo Bardenhagen, Ganderkesee (DE); Marc Soto, Bremen (DE); Julian Schwenzel, Ganderkesee (DE); Katharina Koschek, Bremen (DE); Matthias Busse, Bremen (DE)

(73) Assignee: FRAUNHOFER-GESELLSCHAFT ZUR FOERDERUNG DER ANGEWANDTEN FORSCHUNG E.V., Munich (DE)

( * ) Notice: Subject to any disclaimer, the term of this patent is extended or adjusted under 35 U.S.C. 154(b) by 188 days.

(21) Appl. No.: 16/638,161

(22) PCT Filed: Aug. 23, 2018

(86) PCT No.: PCT/EP2018/072703
§ 371 (c)(1),
(2) Date: Feb. 11, 2020

(87) PCT Pub. No.: WO2019/038348
PCT Pub. Date: Feb. 28, 2019

(65) Prior Publication Data
US 2020/0365938 A1 Nov. 19, 2020

(30) Foreign Application Priority Data

Aug. 24, 2017 (DE) .................... 10 2017 214 817.9
Feb. 8, 2018 (DE) .................... 10 2018 201 984.3
Aug. 23, 2018 (EP) .................. PCT/EP2018/072703

(51) Int. Cl.
*H01M 10/0565* (2010.01)
*H01M 4/60* (2006.01)
*H01M 10/0525* (2010.01)

(52) U.S. Cl.
CPC ....... *H01M 10/0565* (2013.01); *H01M 4/604* (2013.01); *H01M 10/0525* (2013.01); *H01M 2300/0082* (2013.01)

(58) Field of Classification Search
CPC ..................... H01M 10/0564; H01M 10/0565
See application file for complete search history.

(56) References Cited

U.S. PATENT DOCUMENTS

2007/0202365 A1* 8/2007 Sawa .................... H01M 4/661
429/231.95
2015/0083219 A1* 3/2015 Matsumoto .......... H01G 9/2027
136/256

(Continued)

FOREIGN PATENT DOCUMENTS

| CN | 101719427 A | 6/2010 | ............... H01G 9/20 |
| EP | 1 372 210 A1 | 12/2003 | ............ H01M 10/40 |
| WO | WO-2012133581 A1 * | 10/2012 | ............. B82Y 30/00 |

OTHER PUBLICATIONS

WO2012/133581A1 Translation from Espacenet (Year: 2012).*

(Continued)

*Primary Examiner* — Nathanael T Zemui
(74) *Attorney, Agent, or Firm* — Renner, Kenner, Greive, Bobak, Taylor & Weber

(57) ABSTRACT

The present invention relates to a solid-state battery, particularly a lithium-ion solid-state battery, composed of one or more battery cells, which have an ion-conducting solid matrix (2) as solid electrolyte, which matrix is embedded between two electrodes (1, 3). The proposed solid-state battery is characterized in that the solid matrix (2) is formed form camphor, 2-adamantanone or a mixture of one of the (Continued)

two with one or more other substances. Owing to the use of camphor or 2-adamantanone, the solid electrolyte is mechanically stable and has good ionic conductivity in a wide temperature range.

11 Claims, 2 Drawing Sheets

(56) References Cited

U.S. PATENT DOCUMENTS

| | | | |
|---|---|---|---|
| 2016/0028075 A1* | 1/2016 | Yu | H01M 4/366 |
| | | | 429/219 |
| 2016/0322666 A1 | 11/2016 | Kim et al. | H01M 10/052 |
| 2017/0110759 A1* | 4/2017 | Boeckmann | H01M 10/052 |
| 2017/0250439 A1* | 8/2017 | Nitta | H01M 10/0585 |
| 2017/0263980 A1 | 9/2017 | Finsterbusch et al. | |
| | | | H01M 10/0585 |
| 2019/0144590 A1* | 5/2019 | Epps, III | C09J 125/18 |
| | | | 429/308 |

OTHER PUBLICATIONS

International Search Report dated Dec. 4, 2018 in related application No. PCT/EP2018/072703.
Written Opinion dated Dec. 4, 2018 in related application No. PCT/EP2018/072703.

* cited by examiner

SOLID-STATE BATTERY BASED ON AN ION-CONDUCTIVE MATRIX COMPOSED OF CAMPHOR OR 2-ADAMANTANONE

CROSS-REFERENCE TO RELATED APPLICATION

This is a § 371 application of International patent application number PCT/EP2018/072703 filed Aug. 23, 2018, which claims the benefit of German patent application numbers 10 2017 214 817.9 filed Aug. 24, 2017 and 10 2018 201 984.3 filed Feb. 8, 2018.

TECHNICAL FIELD

The present invention relates to a solid-state battery, in particular a lithium-ion solid-state battery, composed of one or more battery cells, which comprise an ion-conductive solid matrix for forming a solid electrolyte which is embedded between two electrodes.

Rechargeable solid state lithium-ion batteries are considered to be the next generation of energy storage devices. They have advantages over commercial lithium-ion batteries with liquid or gel-phase electrolytes in terms of their safety, energy density and long-term stability. Apart from the development of suitable process technologies for manufacturing batteries, a critical consideration for the development of solid-state lithium-ion batteries is the provision of suitable solid electrolytes with high lithium-ion conductivities and the largest possible usable voltage windows. Solid electrolytes are solid ion conductors and occur in a very wide variety of structural forms. As materials, they generally have the form of polymers or ceramics with crystalline or amorphous structure and serve at the same time as solid separators between the electrodes. Since solid electrolytes are not flammable, solid-state batteries are notable for their superior intrinsic operating safety. A drawback is the low mobility of the ions in solid electrolytes, which also constitutes a substantial challenge in the development of solid-state batteries. The solid matrix used for the solid electrolytes should exhibit acceptable ionic conductivities and retain adequate mechanical stability across a wide temperature range.

RELATED ART

In the past, various systems have been considered for use as polymer-based solid electrolytes. Polyethylene oxide (PEO) is the most extensively researched polymer for use as a polymer electrolyte in lithium-ion batteries. It possesses a number of properties which make it interesting for use as a lithium ion conducting polymer electrolyte, particularly the ability to form complexes with lithium salts, a relatively high lithium-ion conductivity, particularly in the amorphous state, and good dimensional stability below the melting range. On the other hand, its loss of dimensional stability above the melting range and low ion conductivity at room temperature due to a tendency to crystallise are disadvantageous. Various approaches have been adopted in an effort to avoid these disadvantages. Thus, dimensional stability at elevated temperatures was increased by mixing with other polymers (blending), crosslinking or by using solid additives (e.g., nanoparticles) for example. Attempts were also made to increase conductivity at low temperatures by lowering the glass transition temperature, through the use of plasticisers, copolymerisation or the inclusion of filler materials, for example.

Plastic crystals were also investigated for use as solid electrolytes in solid-state batteries. Plastic crystals are crystalline compounds which consist of molecules. The description "plastic" refers to their mechanical deformability unlike typical crystalline solids, since it imparts an often wax-like impression. Electrolytes based on plastic crystals are notable for their high thermal stability and good ion conductivities. In this regard, the scientific literature has concentrated particularly on describing the class of dinitriles. The polar nitrogen-carbon bond functions as an effective stabiliser of lithium ions, thereby enabling high concentrations of conductive salts. But the interactions are not so strong that they inhibit the mobility of the lithium ions excessively. Accordingly, many combinations of polymers with succinonitrile (SN) were considered. The material has an additional solid-solid phase transition, wherein a degree of rotational freedom is retained in the molecular crystal lattice. This property enables the solid to dissolve salts, and in the case of the conductive salts to dissociate them as well. This last feature in particular is crucial for obtaining high ionic conductivity and is only possible because of the high dielectric constant of the SN. This in turn is based on the high dipole moment of the terminal nitrile groups. However, because of its low mechanical strength and relatively low melting temperatures, SN in the pure form is not suitable for use as an electrolyte in a solid-state battery despite its high ion conductivities.

The object of the present invention consists in providing a solid-state battery, in particular a lithium-ion solid-state battery, with a solid matrix as solid electrolyte, in which the solid matrix is mechanically stable in a wide temperature range and at the same time enables sufficient ionic conductivity for the operation of the solid-state battery.

PRESENTATION OF THE INVENTION

The object is achieved with the solid-state battery according to claim 1. Advantageous variants of the solid-state battery are subject matter of the dependent claims or may be discerned from the following description and exemplary embodiment.

The suggested solid-state battery is composed in known manner of one or more battery cells which have an ion conducting solid matrix for the formation of the solid electrolyte, which matrix is embedded or disposed between two electrodes, which include corresponding active material. The suggested solid-state battery is characterized in that the solid matrix is formed from camphor ($C_{10}H_{16}O$) or from 2-adamantanone ($C_{10}H_{14}O$) or from a mixture of camphor or 2-adamantanone with one or more other substances, with which an alloy is not formed. Such other substances may be conducting salts, filler materials or other additives, for example, but not other plastic crystals such as SN for example.

The camphor and 2-adamantanone selected for the solid matrix are plastic crystals which have better thermomechanical properties than the SN described previously. Camphor occurs naturally and can be prepared on an industrial scale. 2-adamantanone can be obtained from adamantane, which is contained in petroleum. With melting points of 179° C. (camphor) and 270° C. (2-adamantanone), the two compounds offer a system with considerably greater thermal stability than SN. The dipole moment is generated by the keto group in both compounds, and with values of approximately 3.1 for the camphor and 3.4 for the 2-adamantanone roughly of the same magnitude as for SN. Accordingly, the conducting salt dissociations and therewith the formation of an conically conductive mixture are also possible in both compounds. The wax-like (plastic) behaviour further allows various shaping processes such as compacting, rolling etc., which enable the manufacture of dense, self-supporting electrolytes or also of electrodes (cathodes, anodes).

In a preferred variant, therefore, at least one of the electrodes of the solid-state battery, preferably both electrodes, is/are also formed as a composite electrode from the active material, camphor or 2-adamantanone and a current collector or current transporter as well as other optional constituents. Such constituents may be additives for improving electrical conductivity, such as carbon black or even a binder. In this context, the composite electrodes may be made from the same constituents as corresponding batteries of the related art, wherein only camphor and conducting salt or 2-adamantanone and conducting salt has further been added, so that this (camphor or 2-adamantanone) is present in the finished electrode in a proportion by volume which is preferably in the range between 5% and 25%, particularly preferably between 10% and 20%. The electrodes are further compacted by mechanical processing, for example by rolling or pressing to remove undesirable porosity in the electrodes. The content of camphor or 2-adamantanone and the plastic properties thereof enables complete compaction, with the result that the finished electrodes are completely non-porous.

In the simplest case, the solid-state battery may also consist of just one battery cell. As a rule, however, the solid-state battery is known to include a plurality of battery cells which are stacked one on top of the other and connected to each other electrically either in parallel or in series. In this regard, the suggested solid-state battery does not differ from the solid-state batteries known from the related art.

Through the use of a plastic crystal having better thermomechanical properties than the materials known previously for use as solid electrolyte, solid-state batteries, particularly solid-state lithium-ion batteries may be manufactured which are stable (solid) in the temperature range that is significant for the battery application, from −20° C. to 60° C. They also function well as ionic conductors in this temperature range. Whereas for example PEO-based solid-state batteries have considerably poorer ionic conductivities in this temperature range and must therefore be operated at high temperatures, which reduces the efficiency of the battery and the inherent safety of the battery, this problem does not arise when camphor or 2-adamantanone is/are used as the solid matrix. A further important advantage is offered by the manufacturing options available for the suggested solid-state battery with camphor or 2-adamantanone as solid matrix material instead of ceramics and polymers. Particularly the manufacture of dense electrodes with a high active material content, which is essential for obtaining high energy densities, represents a significant challenge. The plastic deformability of camphor and 2-adamantanone makes it possible to avoid porosities in the electrodes either directly during production or in a post-processing step of the electrodes such as rolling.

Various components for a solid-state or solid-state lithium-ion battery may be produced from the mixture of camphor or 2-adamantanone with metal salts, particularly lithium salts. Composite electrodes made from active material, carbon black, binder and conductive camphor or 2-adamantanone may be produced using the classic slurry process. Because of the plastic crystal, these composite electrodes can be rendered without porosities by subsequent calendering. Overall, the camphor and the 2-adamantanone enable the manufacture of a solid-state battery which is capable of functioning at room temperature and which can be reproduced using conventional production lines.

BRIEF DESCRIPTION OF THE DRAWINGS

In the following text, the suggested solid-state battery will be explained again in greater detail with reference to an exemplary embodiment in conjunction with the drawings. In the drawings.

WAYS TO IMPLEMENT THE INVENTION

Figure 1:
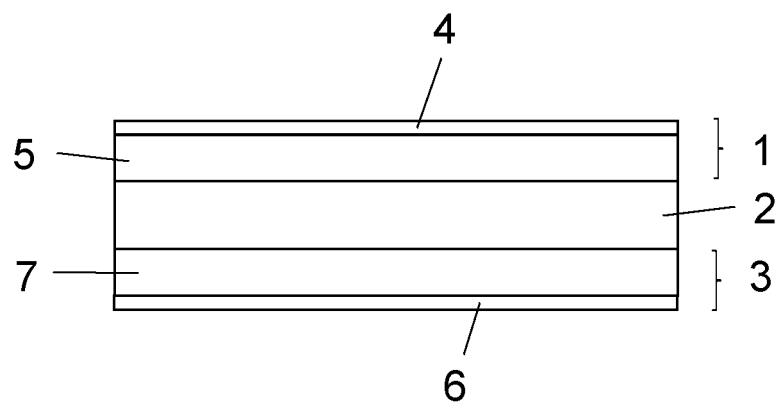
FIG. 1 is a schematic representation of the structure of a battery cell of the suggested solid-state battery.

FIG. 1 shows a highly schematic diagram of the structure of a battery cell of the suggested solid-state battery for exemplary purposes. The battery cell is composed in known manner of the cathode 1 and the anode 3, between which the solid electrolyte 2 is embedded. In the solid-state battery as shown, the solid electrolyte 2 consists of a solid matrix of camphor or 2-adamantanone in which the lithium salts (e.g., LiTFSI, LiBETI, LiAsF$_6$, LiSF$_4$, LiFSI, LiTfO, LiClO$_4$, LiPF$_6$ or LiBOB) are included. For production purposes, camphor or 2-adamantanone are suspended and mixed with lithium salts in a solvent (e.g., acetone or tetrahydrofuran (THF)), the solvent subsequently being removed again.

The anode 3 may be constructed for example as a composite electrode from a layer 7 made up of anode active materials such as graphite or LTO, carbon and a polymer binder to which preferably camphor or 2-adamantanone and conducting salt is added, and a current collector 6 made of copper. The cathode 1 may be made for example from a layer of active material (e.g., LFP, LCO, LMO, NMC or NCA) and carbon, to which preferably camphor or 2-adamantanone and conducting salt is also added, and a current collector made from aluminium 4.

In the following text, two exemplary compositions of the suggested solid-state battery are described.

Example 1

In order to manufacture a composite cathode, a paste is prepared from 83.0 wt % LiFePO$_4$, 6.0 wt % carbon (Super C65), 6.0 wt % binder (PVDF), 4.5 wt % camphor and 1.5 wt % LiTFSI in acetone, deposited as a coating on an aluminium foil, dried and calendered. The paste for the composite anode consists of 82.0 wt % graphite, 6.0 wt % carbon (Super C65), 6.0 wt % binder (PVDF), 4.5 wt % camphor and 1.5 wt % LiTFSI in acetone. This paste is applied in a layer to a copper foil and is also dried and calendered. The electrolyte is produced by uniaxial compression. For this, 75 wt % camphor is mixed with 25 wt % LiTFSI in acetone and this is dried and compressed to a thickness of 100 μm.

Example 2

Figure 2:
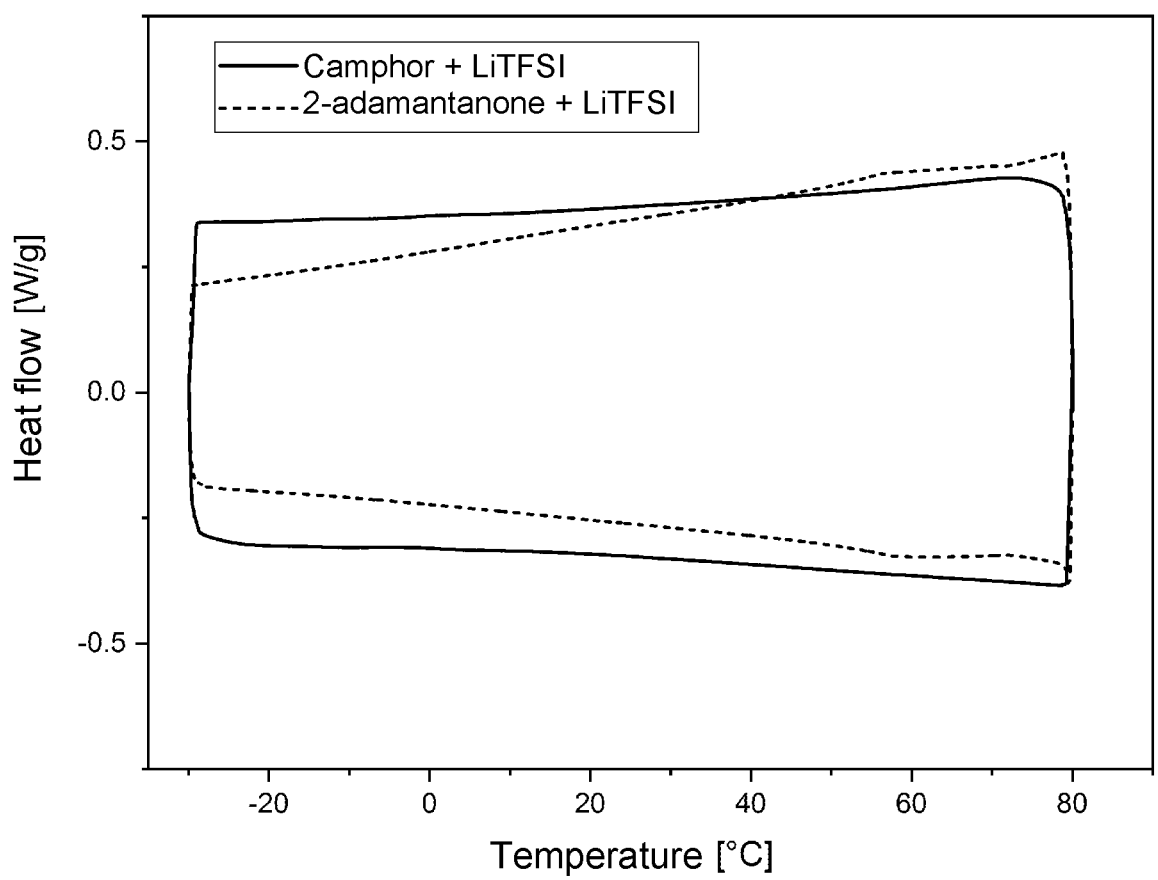
FIG. 2 shows a measurement of the dynamic differential calorimetry of the mixtures of camphor and 2-adamantanone with a lithium salt (LiTFSI, lithium bis(trifluoromethylsulfonyl)imide)
Figure 3:
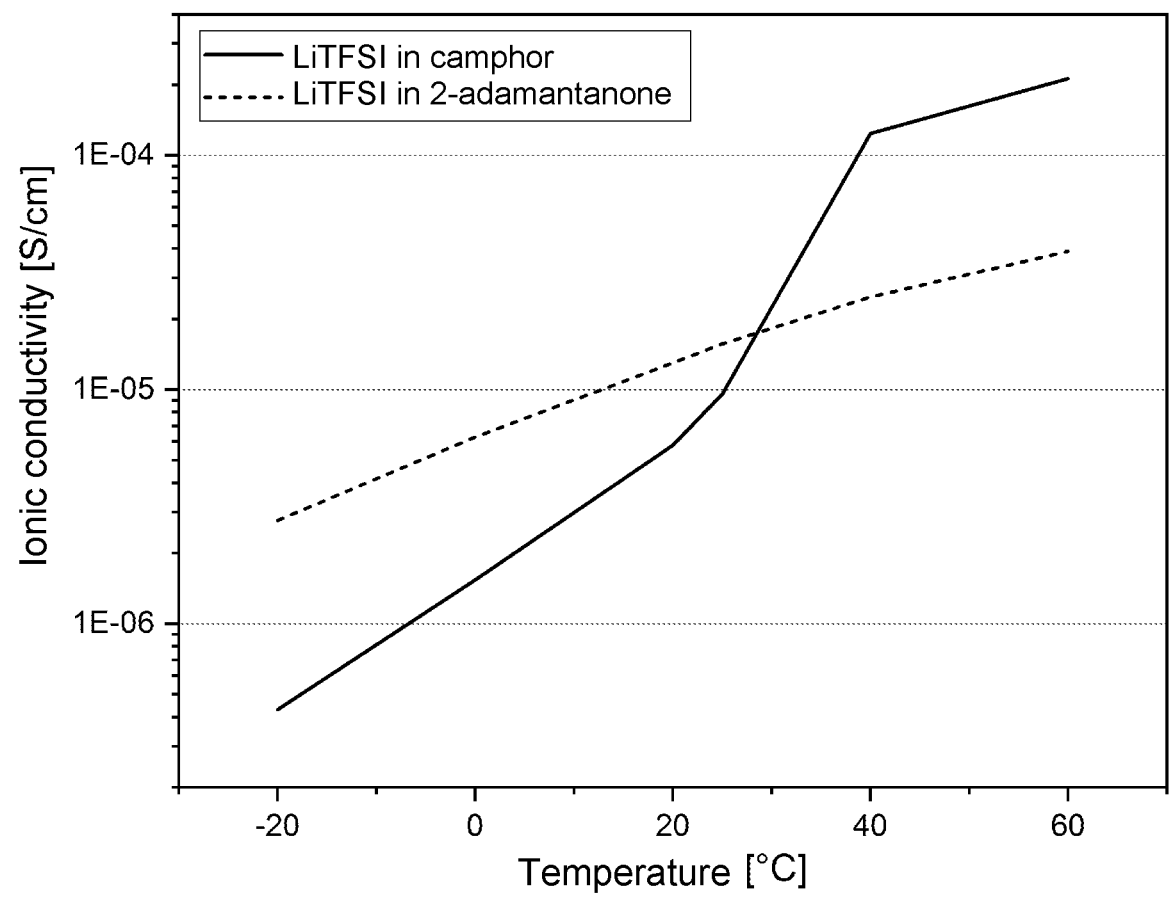
FIG. 3 shows a measurement of the ionic conductivities of the mixtures of camphor and 2-adamantanone with a lithium salt (LiTFSI, lithium bis(trifluoromethylsulfonyl)imide) as a function of temperature.

In order to manufacture a composite cathode, a paste is prepared from 83.0 wt % LiFePO$_4$, 6.0 wt % carbon (Super C65), 6.0 wt % binder (PTFE), 4.5 wt % 2-adamantanone and 1.5 wt % LiTFSI in THF, deposited as a coating on an aluminium foil, dried and calendered. The paste for the composite anode consists of 82.0 wt % graphite, 6.0 wt % carbon (Super C65), 6.0 wt % binder (PTFE), 4.5 wt % 2-adamantanone and 1.5 wt % LiTFSI in THF. This paste is applied in a layer to a copper foil and is also dried and calendered. The electrolyte is produced by uniaxial compression. For this, 75 wt % 2-adamantanone is mixed with 25 wt % LiTFSI in THF and this is dried and compressed to a thickness of 100 μm FIGS. 2 and 3 respectively show measurements of the dynamic differential calorimetry (FIG. 2) and of the ionic conductivities as a function of temperature (FIG. 3) for mixtures of camphor and 2-adamantanone with LiTFSI. From these measurements, it is apparent that both mixtures are thermally stable and good ionic conductors in the temperature range that is significant for the battery application, from −20° C. to 60° C.

REFERENCE LIST

1 Cathode
2 Solid electrolyte
3 Anode
4 Cathodic current collector
5 Cathode composite layer
6 Anodic current collector
7 Anode composite layer

The invention claimed is:

1. A solid-state battery composed of one or more battery cells, which comprise an ion-conducting solid matrix for forming a solid electrolyte, which matrix is arranged between two electrodes,
characterized in that
the solid matrix is a plastic crystal formed from camphor or 2-adamantanone or from a mixture of camphor or 2-adamantanone with one or more other substances, which do not form an alloy with camphor or 2-adamantanone or with a mixture of camphor and 2-adamantanone.

2. The solid-state battery according to claim 1,
characterized in that
at least one of the electrodes is a composite electrode made from an active material, camphor and a current collector as well as other optional constituents.

3. The solid-state battery according to claim 1,
characterized in that
both electrodes are composite electrodes that contain camphor.

4. The solid-state battery according to claim 2, characterized in that
camphor is contained in the composite electrode or composite electrodes in a proportion between 10 and 20% by volume.

5. The solid-state battery according to claim 1,
characterized in that
at least one of the electrodes is a composite electrode made from an active material, 2-adamantanone and a current collector as well as other optional constituents.

6. The solid-state battery according to claim 1, characterized in that
both electrodes are composite electrodes which contain 2-adamantanone.

7. The solid-state battery according to claim 5, characterized in that
2-adamantanone is contained in the composite electrode or composite electrodes in a proportion between 10% and 20% by volume.

8. The solid-state battery according to claim 2, characterized in that
the composite electrode or composite electrodes include(s) additives for improving electrical conductivity.

9. A method for forming a solid electrolyte of a solid-state battery, the method comprising:
providing camphor or 2-adamantanone; and
forming a solid matrix of plastic crystal from said camphor or 2-adamantanone, or from a mixture of said camphor or 2-adamantanone with one or more other substances, which do not form an alloy with camphor or 2-adamantanone or with a mixture of camphor and 2-adamantanone.

10. The solid-state battery according to claim 5, characterized in that
the composite electrode or composite electrodes include(s) additives for improving electrical conductivity.

11. The solid-state battery according to claim 1, characterized in that
the solid-state battery is a lithium-ion solid-state battery.

* * * * *